United States Patent [19]

Hearnshaw

[11] Patent Number: 4,554,403

[45] Date of Patent: Nov. 19, 1985

[54] ARTICULATED SPACER-DAMPER

[75] Inventor: David Hearnshaw, Lutterworth, England

[73] Assignee: Dulmison Pty. Limited, Australia

[21] Appl. No.: 658,234

[22] Filed: Oct. 5, 1984

[30] Foreign Application Priority Data

Oct. 7, 1983 [AU] Australia ............... PG1738

[51] Int. Cl.[4] .................. H02G 7/14; H02G 7/12
[52] U.S. Cl. ..................................... 174/42; 174/146
[58] Field of Search ................................. 174/42, 146

[56] References Cited

U.S. PATENT DOCUMENTS 3,784,723  1/1974  Cantamessa ............... 174/42
4,242,537 12/1980  Hearnshaw ............... 174/42

OTHER PUBLICATIONS (S6056 0204 F) "Spacer Damper for Overhead Transmission Lines", *Research Disclosure*, No. 142, Feb. 1976, pp. 12–13.

*Primary Examiner*—Laramie E. Askin
*Attorney, Agent, or Firm*—Beveridge, De Grandi & Weilacher

[57] ABSTRACT

An articulated spacer damper for transmission line cables is disclosed comprising a frame, a plurality of intermediate arms each resiliently pivotally connected at one end to the frame and at its other end to the proximal end of a clamping arm, the distal end of which is provided with clamping means for respectively grasping individual conductors. Each of the pivotal connections includes a pair of spaced resilient energy absorbing elements having non-circular cross section which are interposed between the respective components and lockingly engaged with recesses formed in each component. The components are clamped together by a locking bolt extending through the elements and defining an axis of hinged part rotation while holding the elements in compression.

9 Claims, 2 Drawing Figures

ARTICULATED SPACER-DAMPER

BACKGROUND OF THE INVENTION

1. Field of the Invention

The present invention relates to spacer dampers for damping oscillations in electric power transmission lines whilst maintaining individual conductors in their predetermined spaced configuration.

2. Description of the Prior Art

One particular form of spacer damper comprises a frame from which extend a plurality of resiliently mounted arms adapted for connection to the conductor lines. Oscillation of the individual conductors causes the arms to move relative to the frame against the resilient restraint of their respective joints, thereby to damp the oscillations while the conductors are maintained in the required spaced relationship. One such spacer damper, hereinafter called the "Hearnshaw Damper" is illustrated in U.S. Pat. No. 4,242,537, the text of which is incorporated herein by way of reference.

In cases where greater damping effect is required it is known to interpose an intermediate arm between the outer arm and the frame with resilient connections between each component. Such an arrangement is illustrated in U.S. Pat. No. 3,784,723. This type of spacer damper is known as an articulated spacer damper.

It is an object of the present invention to provide an articulated spacer damper which incorporates many of the advantages of the above-mentioned Hearnshaw Damper, particularly simplicity of construction and reliability in service.

SUMMARY OF THE INVENTION

According to the invention there is provided an articulated spacer damper comprising a frame, a plurality of intermediate arms each resiliently pivotally connected at one end to said frame and at its other end to the proximal end of a clamping arm, the distal end of which is provided with clamping means for respectively grasping individual conductors, each pivotal connection including a pair of spaced resilient energy absorbing elements interposed between the respective components and lockingly engaged with recesses formed in each component, said components being clamped together by a locking bolt extending through said elements and defining an axis of hinged part rotation while holding said elements in compression, said elements being non-circular in cross section.

BRIEF DESCRIPTION OF THE DRAWINGS

A preferred embodiment of the invention will now be described, by way of example only, with reference to the accompanying drawings, in which.

DESCRIPTION OF THE PREFERRED EMBODIMENT

Figure 1:
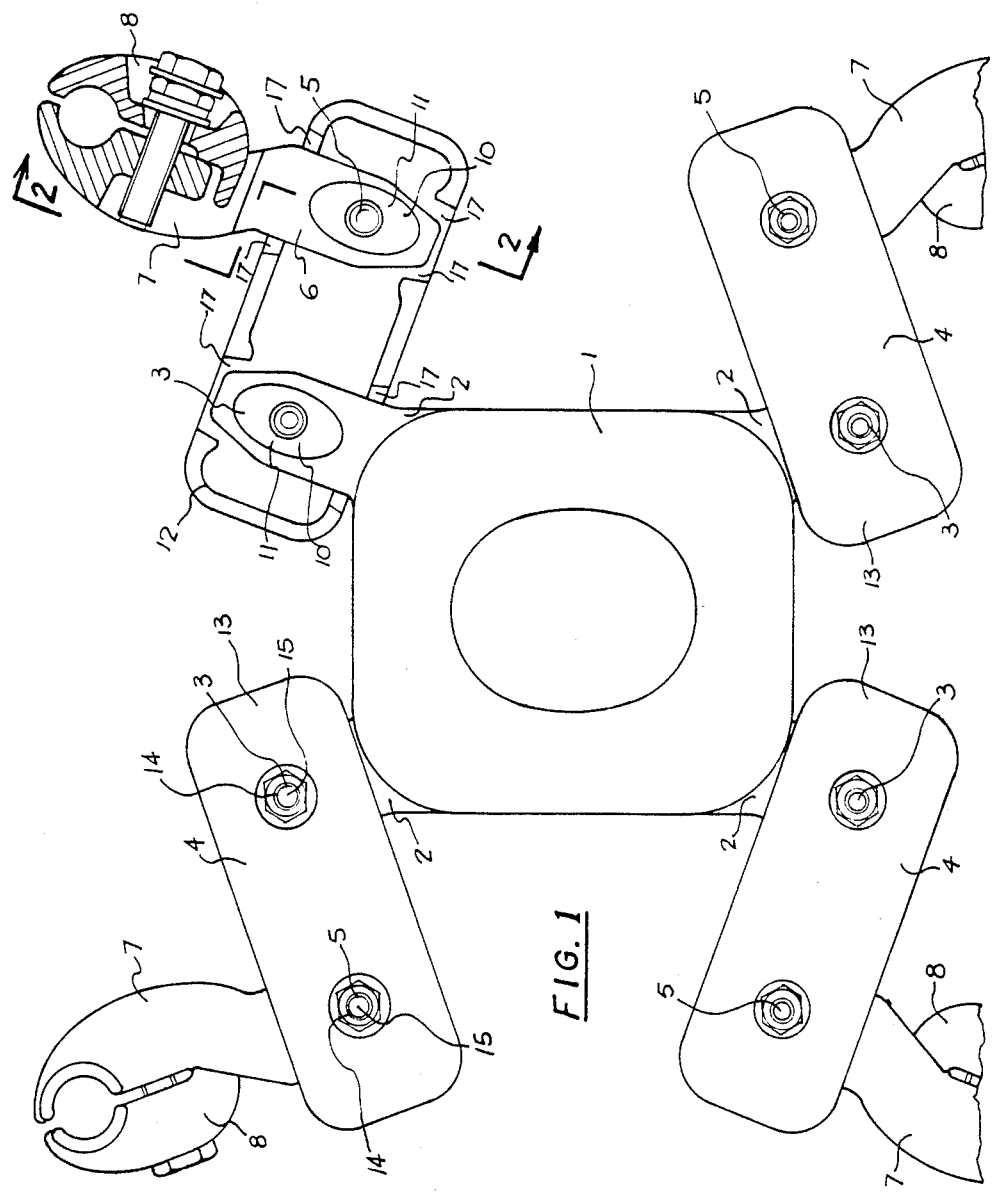
FIG. 1 is a partly sectioned side elevation of an articulated spacer damper according to the invention.

Referring to the drawings, the spacer damper includes a frame 1 from which extends four arm support lugs or tab portions 2. Each support lug or tab portion is resiliently connected by joint 3 to an intermediate arm 4 which is in turn resiliently connected by joint 5 to the proximal end 6 of a clamping arm 7. The distal end of each clamping arm includes a conductor clamp 8 for securing each arm to its respective conductor.

Figure 2:
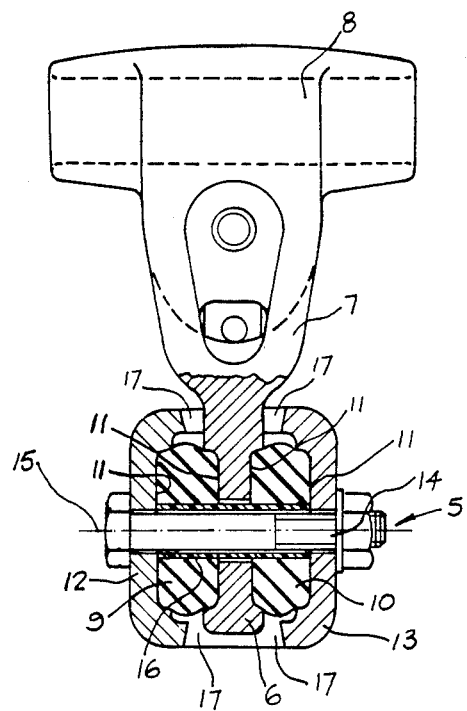
FIG. 2 is a view taken on line 2—2 of FIG. 1.

The two resilient joints 3 and 5 are substantially identical and are best understood with reference to FIG. 2 which illustrates the joint 5. Each joint includes a pair of non-circular cross sectioned resilient energy absorbing elements 9 and 10 which engage correspondingly shaped recesses 11 formed in the respective components, in this case the proximal end 6 of the clamping arm 7 and the two side plates 12 and 13 which define the intermediate arm 4. A locking bolt 14 extends through the joint and holds the resilient elements in compression while defining an axis 15 of hinged part rotation for the joint. A sleeve 16 of plastic material separates the resilient elements from the bolt. The resilient elements are preferably formed of any suitable elastomeric material while the major frame and arm components are preferably cast from aluminium alloy.

The joint 3 is substantially identical to joint 5 except that the centre component is the support lug or tab portion 2 rather than the proximal end 6 of the clamping arm 7.

Appropriate clearance space 17 is provided between the respective components to accommodate a predetermined amount of differential longitudinal conductor motion as well as transverse motion. The clearance is selected such that the maximum possible twist or axial displacement of the respective components is limited so as to ensure that excessive loads do not cause complete loss of compression of the resilient elements.

The degree of compression of the resilient elements is selected for optimum environmental resistance and endurance properties. When subjected to forces causing relative movement of the metallic components, torsional shearing of the resilient elements provides the required flexibility and damping characteristics for the joint.

It will be observed that the various components are substantially in the same plane such that eccentric loadings are substantially eliminated.

The resilient elements may be of any other non-circular or appropriately keyed shape but are preferably elliptical as shown, being flat-ended and of constant cross-section when uncompressed. This particular shape provides a progressively increasing stiffness as the arm rotates about the bolt axis. Thus, high frequency aeolian vibrations, being of lower amplitude, will impose relatively small displacements on the resilient elements and will thereby encounter higher flexibilities which are consistent with optimum control. Low frequency conductor oscillations, on the other hand, are of a relatively higher amplitude and so will impose increased displacements on the resilient elements and will thereby encounter greater resistance and lower flexibility, again for optimum control.

The invention may, of course, be embodied to accommodate conductor bundles other than four, although combinations other than 2, 3 or 4 conductors are unlikely to be required.

Although the invention has been described with reference to a specific example, it will be appreciated that the invention may be embodied in many other forms.

I claim:

1. An articulated spacer damper for electrical transmission lines comprising a frame member; a plurality of intermediate arm members; a plurality of first connection means, each one of said first connection means resiliently pivotally connecting a first end of an associated one of said intermediate arm members to said frame member; a plurality of clamping arm members, each having a proximal end and a distal end; a plurality of second connection means, each one of said second connection means resiliently pivotally connecting the second end of an associated one of said intermediate arm members to the proximal end of an associated one of said clamping arm members; a plurality of clamping means; means adjustably attaching each one of said clamping means to the distal end of an associated one of said clamping arm members; each of said first connection means and said second connection means including a pair of non-circular, resilient energy absorbing elements lockingly positioned within recesses formed in said frame member, in said associated one of said intermediate arm members, and in said proximal end of said associated one of said clamping arm members and a locking bolt extending through the associated pair of resilient energy absorbing elements, the associated intermediate arm member, and the frame member or the associated clamping arm member to define an axis for hinged pivoting while holding said resilient energy absorbing elements in compression.

2. An articulated spacer damper according to claim 1 wherein said resilient energy absorbing elements are elliptical in cross-section.

3. An articulated spacer damper according to claim 2 wherein said elements are flat-ended and of constant cross-section when uncompressed.

4. An articulated spacer damper according to claim 1, wherein each of said intermediate arm members comprises two substantially parallel plates, a pair of said energy absorbing elements and a connection portion of said frame member being clamped between the proximal end of said plates, and a pair of said energy absorbing elements and the proximal end of the associated clamping arm member being clamped between the distal end of said plates.

5. An articulated spacer damper according to claim 4 wherein said frame member includes an outwardly extending substantially planar tab corresponding to each of said intermediate arm members, said tabs comprising the connection portions of said frame member.

6. An articulated spacer damper according to claim 1 wherein said frame member is in the form of a closed ring and supports four clamping arm members.

7. An articulated spacer damper according to claim 1 wherein said frame member is triangular in form and supports three clamping arm members.

8. An articulated spacer damper according to claim 1 wherein said frame member supports two clamping arm members.

9. An articulated spacer damper for electrical transmission lines comprising:

a substantially planar closed-loop frame member having a plurality of tab portions extending outwardly therefrom and substantially coplanar therewith, each tab portion having opposite first and second faces with a non-circular recess in each face and a hole passing therebetween interconnecting said recesses;

a plurality of clamping arm members, each including a proximal end and a distal end, each clamping arm member proximal end having opposite first and second faces with a non-circular recess in each face and a hole passing therebetween interconnecting said recesses;

a plurality of non-circular, resilient energy absorbing elements, each energy absorbing element having a hole passing therethrough, one energy absorbing element positioned within each frame member tab portion recess and each clamping arm member proximal end recess with the energy absorbing element hole aligned with the associated recess hole;

a plurality of intermediate arm members, each including a first half portion and a second half portion, each half portion having a recess therein and a pair of holes passing therethrough, the half portions of each intermediate arm member positioned with an associated frame member tab portion and an associated clamping arm member proximal end therebetween with the half portion recesses adjacent opposite faces of said associated frame member tab portion and opposite faces of the proximal end of said associated clamping arm member to enclose said energy absorbing elements, said tab portions and said clamping arm member proximal ends within said half portion recesses, with the associated recess holes and energy absorbing element hole aligned, and with said energy absorbing elements held in compression;

a plurality of locking bolts, one locking bolt passing through each aligned set of recess and energy absorbing element holes to lockingly and resiliently pivotally connect said frame member tab portions, said intermediate arm members, said clamping arm members, and said resilient energy absorbing elements together with the distal ends of each adjacent pair of said clamping arm members spaced apart a distance greater than the maximum dimension of said frame member, and to define an axis for hinged pivoting thereof with respect to each other;

a plurality of clamping means; and a plurality of adjustable attaching means for attaching said clamping means to the distal ends of said clamping arm members for clamping of an electrical transmission line to attach said articulated spacer damper to a plurality of transmission lines for articulated spacing and damping thereof.

* * * * *